(12) United States Patent
Christopher et al.

(10) Patent No.: US 10,989,302 B2
(45) Date of Patent: Apr. 27, 2021

(54) METHOD AND DEVICE FOR MOUNTING SHAFT SEALS PERMITTING ECCENTRIC MOTION

(71) Applicant: Cathedral Energy Services Ltd., Calgary (CA)

(72) Inventors: Keith J. Christopher, Calgary (CA); Bogdan A. Picioreanu, Calgary (CA)

(73) Assignee: Cathedral Energy Services Ltd., Calgary (CA)

( * ) Notice: Subject to any disclaimer, the term of this patent is extended or adjusted under 35 U.S.C. 154(b) by 11 days.

(21) Appl. No.: 16/450,483

(22) Filed: Jun. 24, 2019

(65) Prior Publication Data

US 2019/0309848 A1    Oct. 10, 2019

Related U.S. Application Data

(62) Division of application No. 15/664,939, filed on Jul. 31, 2017, now Pat. No. 10,378,650.

(51) Int. Cl.
*F16J 15/3204* (2016.01)
*F16J 15/00* (2006.01)
*F16J 15/3224* (2016.01)

(52) U.S. Cl.
CPC ......... *F16J 15/002* (2013.01); *F16J 15/3204* (2013.01); *F16J 15/3224* (2013.01)

(58) Field of Classification Search
CPC .............................. F16J 15/002; F16J 15/3204
See application file for complete search history.

(56) References Cited

U.S. PATENT DOCUMENTS

| 3,169,024 A * | 2/1965 | Johnson | F16J 15/008 |
| | | | 277/321 |
| 4,588,195 A | 5/1986 | Antonini et al. | |
| 6,578,849 B2 * | 6/2003 | Haje | F16J 15/164 |
| | | | 277/389 |
| 7,708,285 B2 * | 5/2010 | Grimanis | F16J 15/36 |
| | | | 277/379 |
| 7,963,526 B2 | 6/2011 | Dahlheimer | |

FOREIGN PATENT DOCUMENTS

EP        1096169 A3    9/2003

* cited by examiner

*Primary Examiner* — Gilbert Y Lee
(74) *Attorney, Agent, or Firm* — Field LLP

(57) ABSTRACT

A device and method are taught for mounting an annular shaft seal between a bore and a shaft in which the shaft and bore may be subject to radial eccentricity. The device comprises an annular sealing case having a first end and a second end; a shaft sealing case having a first end and a second end; a flexible sealing linkage axially and sealingly connecting the second end of the annular sealing case to the first end of the shaft sealing case. The annular sealing case is shaped to receive a seal to seal against an interior surface of the bore, and the shaft sealing case is shaped to receive a seal to seal against an exterior surface of the shaft, and the flexible sealing linkage provides sealing between the annular sealing case and the shaft sealing case.

6 Claims, 5 Drawing Sheets

METHOD AND DEVICE FOR MOUNTING SHAFT SEALS PERMITTING ECCENTRIC MOTION

FIELD OF INVENTION

A method and device is provided for mounting seals between an annular bore and a shaft which permits a relatively large degree of eccentric motion between the shaft and the bore without adversely affecting the function of the seals.

BACKGROUND OF THE INVENTION

A common requirement in the design of machines is to create a seal between a shaft and annular bore; the purpose of which varies, but could include retaining lubrication in a cavity, forming a pressure seal for hydraulic or pneumatic applications or excluding environmental contaminants. In the typical case, the shaft will often be subject to rotation or translation relative to the bore. For the purposes of the description herein, the bore will be assumed to be a "stationary" portion and the shaft will be a "moving" portion. Typically, an engineer must select a seal (or set of seals) from a vast array of different commercially available seal types that have been custom designed for specific performance under a specific set of circumstances. The selection and design of seals and seal assemblies will depend on design envelope, including the geometry limitations within which the design must fit, nature of the movement between the components, shaft and bore materials, media to be sealed against, temperature, service life, specific controlled leak rate, contaminant exposure, and other compatibility requirements. Much research and design effort continues to be done in this field and the proper selection of seals is a critical part of almost any application. For many applications characterized by high or very low pressures, high or very low temperatures, high speeds, long service life or aggressive media the available seals meeting all the requirements share the common drawback that for effective use, the shaft and bore must be concentric to within an extremely close tolerance (often on the order of 0.001 in or less).

This leads to one of the most common forms of seal failure, which is generally referred to as shaft eccentricity. Due to the result of mounting misalignments, manufacturing deviations in the shaft or bore axis, high side-loads or accumulated damage to the shaft or bore, the motion of the shaft can attain a much higher level of eccentricity with respect to the bore. The result of this eccentricity generates an uneven seal load and/or intermittent or positional separation between the shaft and seal or between seal and bore that can cause outright failure, increased leak rate, heat buildup or invasion of contaminants resulting in a great reduction of seal life, often by 90% or more.

It may also be desirable to accommodate large intentional movements of the shaft along the axis, which may or may not also be rotating. In such cases, the seal may be needed to: A) remain in position and slide along the shaft; or B) move to a large degree along the axis, which may or may not form a dynamic seal.

In light of these problems there has been some limited design work done in the creation of seals that allow for an increased degree of eccentricity in the shafts. The details of such prior designs can be found in the prior artwork:

U.S. Pat. No. 4,588,195 A—Floating lip seal assembly with convoluted flexible section U.S. Pat. No. 7,963,526 B2—Pre-lubricated multi-lipped radial shaft seal with large radial offset accommodation.

EP 1,096,169 A3—Shaft seal for eccentric air brake lever in which a shaft part 38 and a bore/annular part 46 are connected by flexible piece 50 that is spaced radially from each seal component, forming a u-shape. The design is limited to a specific seal and bore geometry. Furthermore, the seal assembly, being radially stacked, results in a large radial section area required between the shaft and the bore. In this design, having a convolution across the linear axis, proper function is limited to rotational motion only, and the seal will not function appropriately in a translating (linear motion) application.

In the prior art, the specific design of the sealing element means that only a very specific set of sealing problems may be effectively solved. Additionally, the complexity of manufacture and design of the prior art prohibits their use in small section applications, where there is minimal radial space between the bore and shaft. Additionally, the specificity of and complexity of the design means that their scope of use is limited to very specific applications and cannot easily be or selected for use with small geometry, high pressure/temperature combinations, cryogenic temperatures, or highly abrasive media.

It is therefore beneficial to develop a method and device for mounting any commercially available shaft seal in a manner which would greatly increase the allowable shaft/bore eccentricity. Thus allowing the engineer far more options when selecting seal types, or setting machine design tolerances.

SUMMARY OF THE INVENTION

The invention herein describes a method and device for mounting a commercially available shaft seal in such a manner as to maintain the effectiveness of the seal even with a high degree of eccentricity, dynamic or static, between the housing bore and the shaft. The device may be used as a "drop in replacement" for current traditional shaft seal mounts in order to increase the life of the seals and time between services.

Considered broadly, the tool and method is comprised of an annular sealing case designed to accept a first commercially available seal on an exterior surface thereof, to fit between the bore and shaft to form a static seal between the bore and the annular sealing case, with room for radial movement. The annular seal case is flexibly connectible to a shaft sealing case. The shaft sealing case is designed to accept a second commercially available seal. This second seal then forms a dynamic seal against the shaft and static seal against the shaft sealing case.

Thus, a device is taught for mounting an annular shaft seal between a bore and a shaft in which the shaft and bore may be subject to radial eccentricity. The device comprises an annular sealing case having a first end and a second end; a shaft sealing case having a first end and a second end; a flexible sealing linkage axially and sealingly connecting the second end of the annular sealing case to the first end of the shaft sealing case. The annular sealing case is shaped to receive a seal to seal against an interior surface of the bore, and the shaft sealing case is shaped to receive a seal to seal against an exterior surface of the shaft, and the flexible sealing linkage provides sealing between the annular sealing case and the shaft sealing case.

A method is further provided for sealing between a bore and a shaft, in a rotating or translating application, while allowing for radial eccentricity between the shaft and bore. The method comprises the steps of providing a sealing case system comprising: an annular sealing case having a first end and a second end; a shaft sealing case having a first end and a second end; and a flexible sealing linkage axially connecting the second end of the annular sealing case to the first end of the shaft sealing case. Then receiving one or more first seals in the annular sealing case, to statically seal the annular sealing case against an interior surface of the bore; receiving one or more second seals in the shaft sealing case, to dynamically seal the shaft sealing case against an exterior surface of the shaft; inserting the sealing case system with the first and second seals between the bore and the shaft; and sealing between the annular sealing case and the shaft sealing case by the axial connection between the annular sealing case and the shaft sealing case by the flexible sealing linkage; allowing translating of the flexible sealing linkage to accommodate radial eccentricity between the shaft and the bore; and maintaining the annular sealing case in a coaxial relationship with the bore and maintaining the shaft sealing case in a coaxial relationship with the shaft.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

A further, detailed, description of the invention, briefly described above, will follow by reference to the following drawings of specific embodiments of the invention. The drawings depict only typical embodiments of the invention and are therefore not to be considered limiting of its scope. In the drawings.

Figure 1:
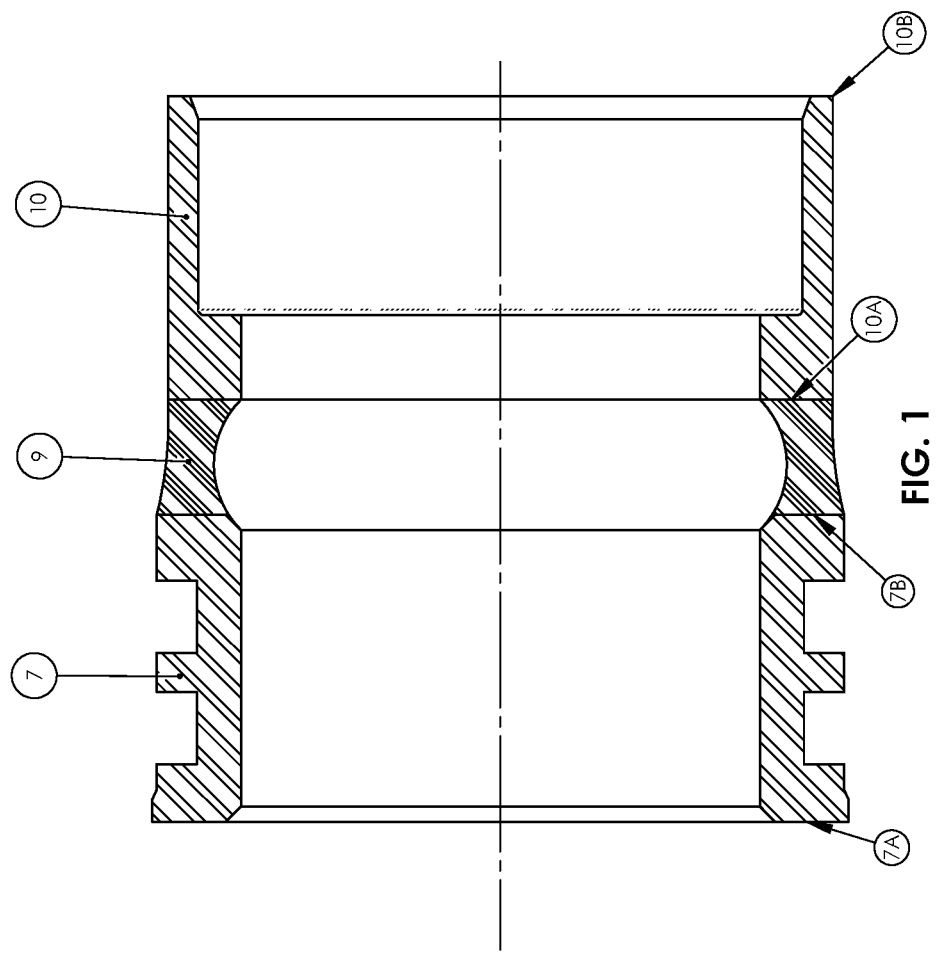
FIG. 1 is a cross sectional view of one preferred embodiment of the invention with elastomeric flexible linkage (9) bonded to the cases on either side.

The drawing is not necessarily to scale and in some instances proportions may have been exaggerated in order more clearly to depict certain features.

DETAILED DESCRIPTION OF THE INVENTION

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present sealing cases can be used with any number machines. For example, the present sealing cases can be used with downhole tools, including but not limited to mud motors, as well as telemetry systems, power generation systems and other systems incorporating shaft and bore arrangements. As would be well understood by a person of skill in the art, the present invention could be broadly applied to a very many designs to reduce the cost and reliance on specialized seals for any reciprocating or rotating machinery.

With reference to FIGS. 1-4, these figures show four possible preferred embodiments of the invention. In each embodiment, an annular sealing case (7) is flexibly connectible to a shaft sealing case (10). Preferably, the annular sealing case (7) is connectible to the shaft sealing case (10) by a flexible sealing linkage (9). The flexible sealing linkage (9) can be made of any number of materials, including but not limited to elastomeric elements, metal elements, or polymeric elements. The flexible sealing linkage (9) can be a section with or without convolutions, meaning it can be a straight or convoluted linkage. In the case of metal or stiff polymeric flexible sealing linkages, the linkage (9) is preferably a convoluted section.

The annular sealing case (7) has a first end (7a) and a second end (7b); the shaft sealing case (10) similarly has a first end (10a) and second end (10b). The flexible sealing linkage (9) preferably connects the second end (7b) of the annular sealing case (7) to the first end (10a) of the shaft sealing case (10).

In FIG. 1, the flexible sealing linkage (9) is more preferably in the form of an elastomeric element that can be chemically bonded to the annular sealing case (7) and the shaft sealing case (10), or moulded together with the cases (7, 10) on either side. The elastomeric element can include, but is not limited to, such elastomers as fluoroelastomers (FKM such as Viton™), perfluoroelastomers (FFKM), Highly Saturated Nitrile (HSN, HNBR), silicone, ethylene propylene diene monomer (EPDM), natural rubber, Nitrile, Neoprene, and Fluorosilicone.

Figure 2:
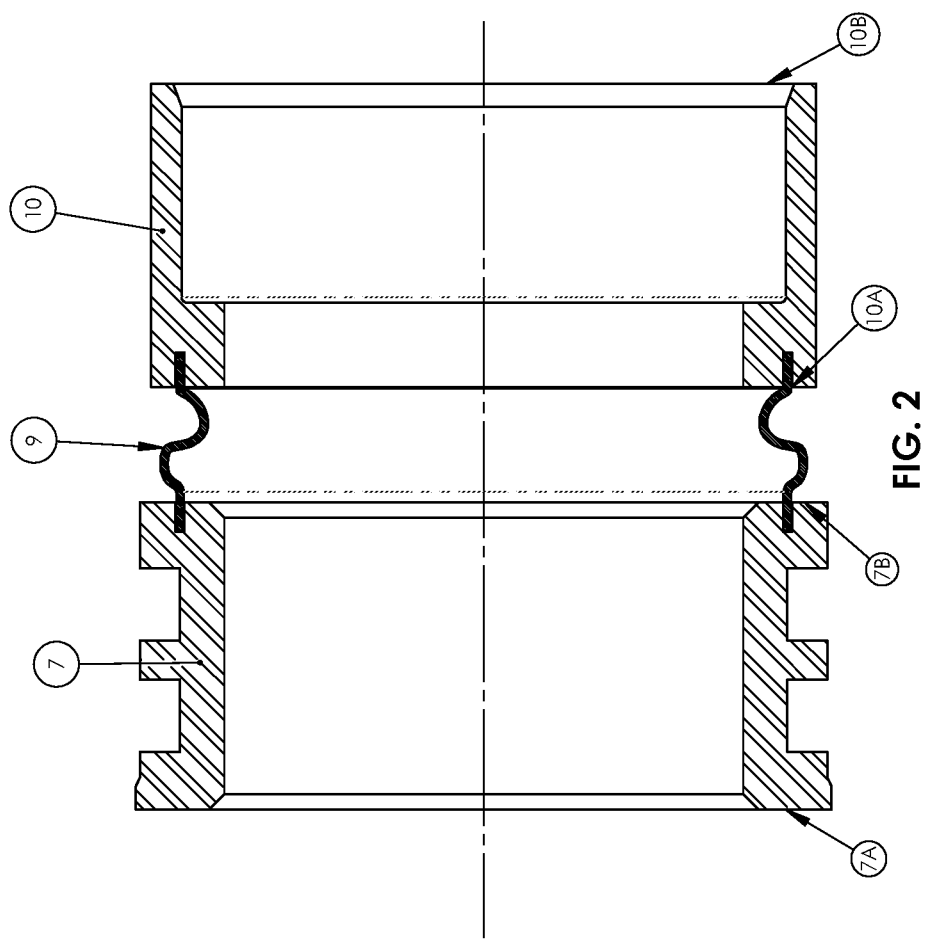
FIG. 2 is a cross sectional view of a second, embodiment of the invention with metallic flexible linkage (9) bonded to the case on either side via mechanical clamping.
Figure 3:
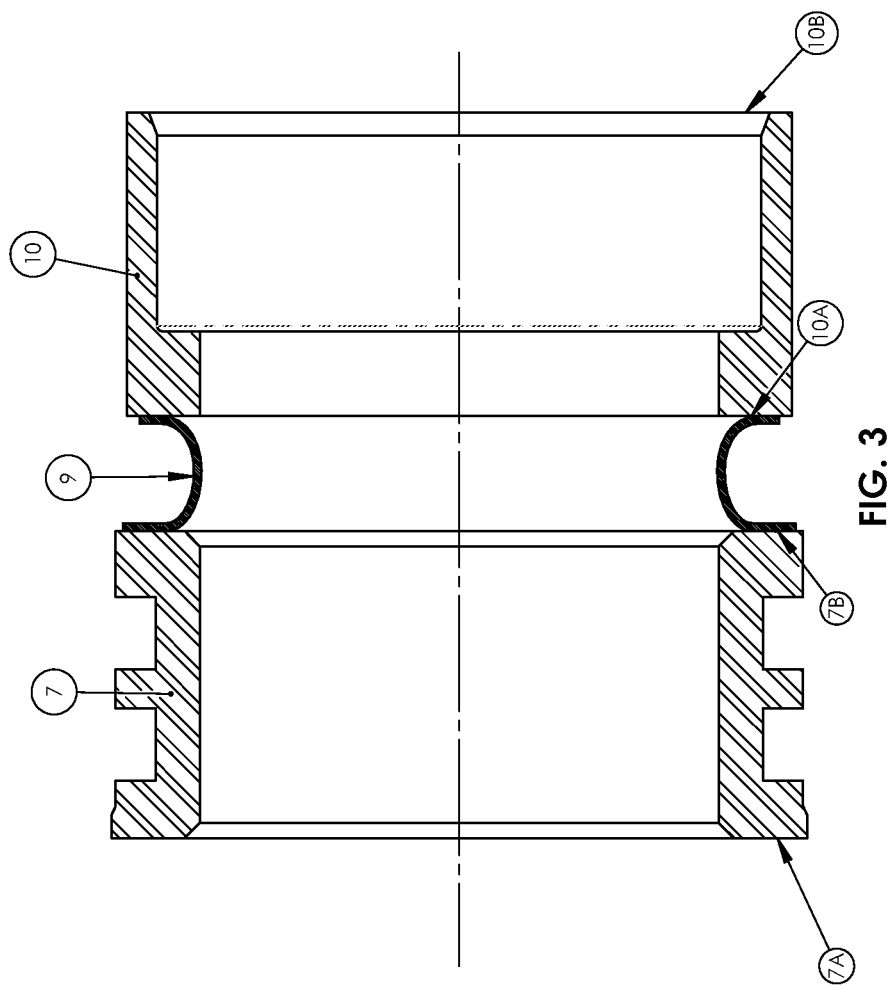
FIG. 3 is a cross sectional view of a third embodiment of the invention with metallic flexible linkage welded to the case on either side.

In FIGS. 2 and 3 the flexible sealing linkage (9) is more preferably in the form of a metallic or polymeric element. In FIG. 2, the element is attached to the cases (7, 10) by means of clamping the element into each of the cases. In the case of FIG. 3, the element is welded to each of the cases (7, 10).

Figure 4:
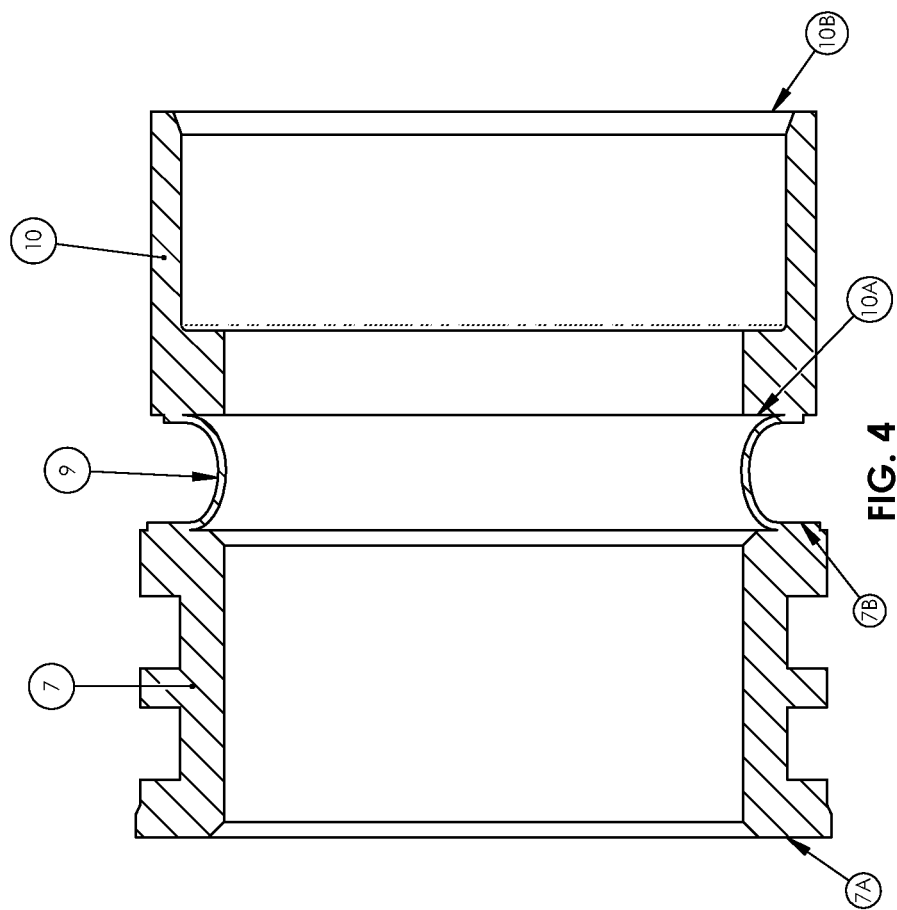
FIG. 4 is a cross sectional view of a fourth embodiment of the invention where the device is made from a single piece of metal or polymer with a variable section.

In FIG. 4 the annular sealing case (7) flexible linkage (9) and shaft sealing case (10) are formed (cast, moulded or machined) out of a single piece of metal or polymer, where the flexible linkage is formed as having a significant change is cross section shape as compared to the annular sealing case (7) and the shaft sealing case (10). The design of FIG. 4 avoids and reduces weakness associated with attachment of dissimilar materials.

The metallic element can include, but is not limited to, such metals as stainless steel, carbon steel, copper beryllium, Inconel, Hastelloy™, Waspaloy™, Elgiloy™, titanium, Monel, tin, aluminum, brass or copper.

The polymeric element could include, but is not limited to, such polymers as, polytetrafluoroethylene (PTFE), polyether ether ketone (PEEK), polyaryletherketone (PEKK), thermoplastic polyurethane (TPU), polyamide, polyimide, or polyvinylchloride (PVC).

It is important to note that the designs shown here are not an exhaustive list of the possible material and methods of construction but only a sample of more space effective and cost effective means available. For instance the flexible linkage attachment could be accomplished using a bolted flange connection to a metal bellows with additional static seals. One of the key strengths of the invention is that the material of the flexible linkage (9) and the method of connection to the annular sealing case (7) and the shaft sealing case (10) can be easily customized to the space requirements of the designer and as such, minor changes in material selection or connecting mechanism cannot be considered to depart from the scope or intent of the invention.

The present invention sealing case system can be used with any type of seal. Furthermore, in prior art systems in which the annular seal and the shaft sealing case are radially stacked, a large annular area between the shaft and bore is required to accommodate the system. In the present system, the annular sealing case (7) and the shaft seal case (10) are axially stacking with the flexible linkage between the two. This axial arrangement allows use in closer bore and shaft arrangements with smaller annular gap. The prior art, having a bend or convolutions across the linear axis, is limited to rotational motion only, whereas the present invention can accommodate both linear and rotational motion.

Figure 5:
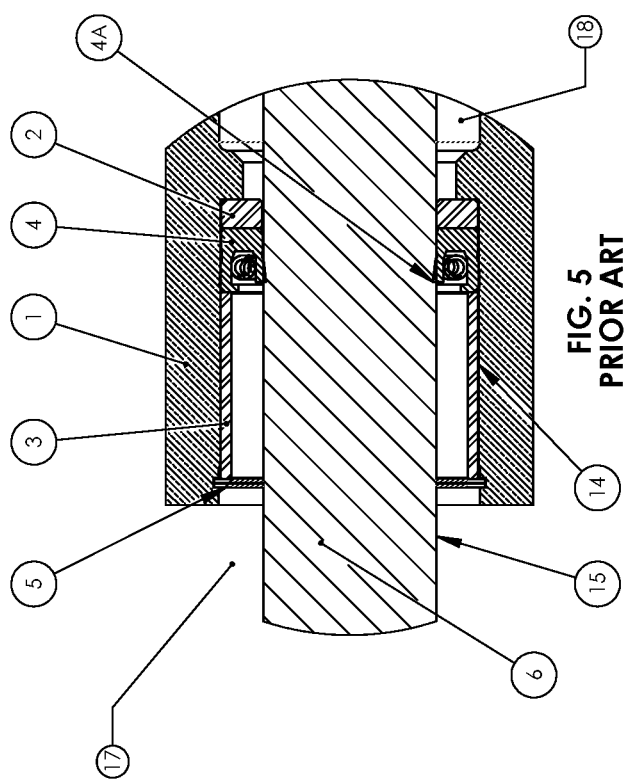
FIG. 5 is a cross sectional view of a prior art bore and shaft with seal arrangement.

FIG. 5 shows a prior art design of a typical shaft/bore mounting with a seal in place. The bore (1) surrounds the shaft (6) which sits essentially coaxial with the bore and can only accommodate a limited degree of eccentricity. The sealing system could be selected from any of a number of commercially available sealing system designs that have been customized for specific performance. Some examples of seals include a Kalsi° Seal, a spring energized lip seal, or a Step Seal®. Shown here is a generic spring energized lip seal system consisting of a backup ring (2), the seal (4), the front spacer (3) and the retaining ring (5).

Figure 6:
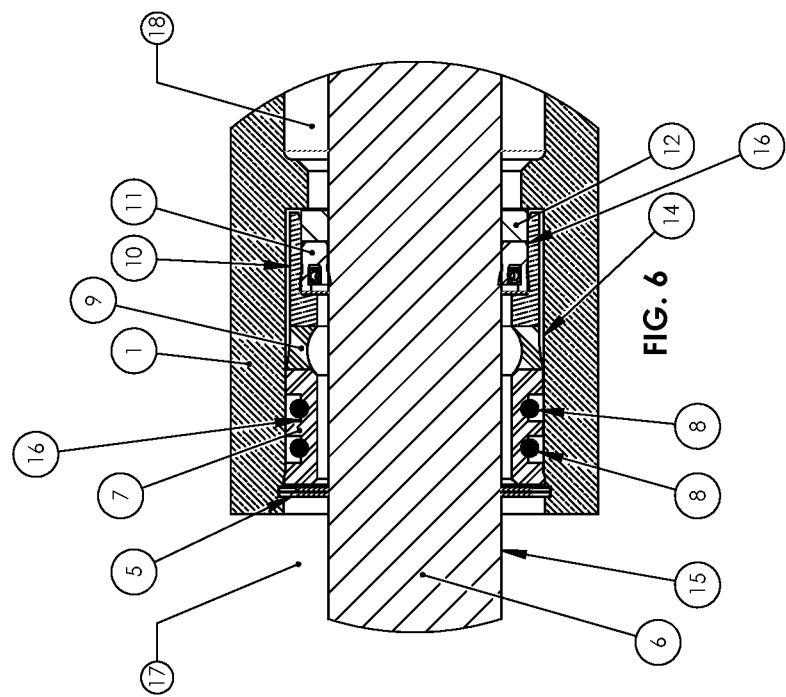
FIG. 6 is a cross sectional view of a bore and shaft seal arrangement mounted with one example of the device of the present invention.

FIG. 6 shows a comparative shaft and bore to FIG. 5, with similar seals mounted using the system and device of the present invention. The bore (1) surrounds the shaft (6) which is essentially coaxial with the bore but may display some degree of eccentricity. The sealing system of the present invention, and in particular that of FIG. 1, is shown in use. It would be well understood that any variant of the present sealing system, including but not limited to those of FIGS. 2, 3 and 4, could just as easily be incorporated in FIG. 6, but that the embodiment of FIG. 1 is shown for example sake. A backup ring (12) and a seal (11), are mounted inside the shaft sealing case (10). The first end 10a of the shaft sealing case (10) is attached to the flexible sealing linkage (9), which is in turn attached to the second end (7b) of the annular sealing case (7). The annular sealing case (7) is mounted with static bore seals (8) and held in place by a retaining ring (5). The backup ring and retaining means can be used with the present invention, but are not necessarily part of the present invention. The static bore seals (8) and the dynamic seals (11) can be any commercially available seal.

The invention as shown in FIG. 6 is the more preferred embodiment, also shown in FIG. 1, where the flexible sealing linkage (9) is comprised of a solid elastomer that has been hot vulcanize bonded to the annular and shaft sealing cases (7 & 10).

Operation of the present invention is now described.

In the prior art configuration shown in FIG. 5, the seal is made by the compression of the seal lip (4A) against an interior surface (14) of the bore (1) and against an exterior surface (15) of the shaft (6). In this configuration, any excessive eccentricity of the shaft (6), beyond the tolerance of the seal (4), can cause uneven compression of the seal (4) or excessive force and wear on the back up ring (2). In an application in which the shaft (6) is either rotating or reciprocating, a continual flexing of the seal (4) would also occur. All of these issues can cause premature seal failure and component damage.

In FIG. 6, as part of the present invention a smaller dynamic seal (11) of the same type of seal (4) as used in the prior art can be selected as the dynamic component. This ensures that all the benefits and performance of the original seal selected for the application is preserved. The sealing path is then formed by the compression of the dynamic seal (11) against an inside surface 16 of the inside of the shaft seal case (10) and against the exterior surface 15 of the shaft (6). The flexible seal linkage (9) between the shaft seal case (10) and the annular seal case (7) continues the seal path. Finally, the annular sealing case (7) is sealed to the inside surface 14 of the bore (1) via the static seals (8), thus terminating the sealing path. The entire assembly is held in place using a retaining means (5). The retaining means can be any type of retaining means, including but not limited to (i) a captured gland, (ii) a split gland utilizing a snap ring (iii) a threaded mounting, (iv) a bolted flange mounting, (v) a screwed flange mounting, or (vi) a radial screw mounting.

In use, the present seal case system, including the annular and shaft seal cases connected by flexible linkages is first fitted with static and dynamic seals and optionally with backup rings and retaining means, and then the unit can either be inserted into bore with shaft is inserted through center of the seal case system, or the unit can be inserted onto the shaft and then shaft and unit are inserted into the bore.

Mounting of the sealing system using some of the alternate methods described above could require customization of the annular sealing case (7) and it is understood that customization of exterior profiles of the annular sealing case to be compatible with the mounting configuration of any number of sizes of seal stack would be well understood to one skilled in the art. Additionally the invention is shown in its preferred embodiment using O-rings as the static sealing element (8), but it should be obvious to those skilled in the art that these could be replaced with any commercially available static sealing element, such as a T-Seal or Wedge Pack®. The geometry of the sealing area (16) of the annular sealing case (7) is also shown as a smooth bore surface to replicate the smooth bore (14) in FIG. 5 but it could easily be customized with a rod style seal gland or other geometry for mounting other types of seals such as capped "T" seals, elastomer energized polymeric seals, spring energized polymeric seals, or Kalsi™ seals as common examples, as required by the specifics of the sealing application.

When in operation, the sealing path as described above, prevents transfer of fluid or pressure from the exterior cavity (17) to the interior cavity (18). Additionally any eccentric motion between the shaft (6) and the bore (1) will not cause an excessive loading or deformation of the shaft seal (11) or backup ring (12), nor will it cause the seal to break contact with any component. Instead, the movement of the shaft (6) will cause the flexible linkage (9) to translate by the amount of the eccentricity and the bore seal, formed by static seal (8) and annular sealing case (7) will remain coaxial with the bore, while the shaft seal, formed by shaft sealing case (10) dynamic seal (11), and backup ring (12) is allowed to remain coaxial with the shaft (6). The amount of deviation permitted by the present invention can be limited by the difference in outer diameter of the shaft sealing case (10) and the inner diameter of the bore (1). In this manner, issues resulting from shaft eccentricity can be resolved, without resorting to the selection of a different (possibly inferior) type of seal.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The embodiments of the invention in which an exclusive property or privilege is claimed are defined as follows:

1. A method for sealing between a bore and a shaft in a rotating or translating application, while allowing for radial eccentricity between the shaft and bore, said method comprising the steps of:
    a. providing a sealing case system comprising:
        i. an annular sealing case having a first end and a second end;
        ii. a shaft sealing case having a first end and a second end; and
        iii. a flexible sealing linkage axially connecting the second end of the annular sealing case to the first end of the shaft sealing case;
    b. receiving one or more first seals in the annular sealing case, to statically seal the annular sealing case against an interior surface of the bore;
    c. receiving one or more second seals in the shaft sealing case, to dynamically seal the shaft sealing case against an exterior surface of the shaft;
    d. inserting the sealing case system with the first and second seals between the bore and the shaft; and
    e. sealing between the annular sealing case and the shaft sealing case by the axial connection between the annular sealing case and the shaft sealing case by the flexible sealing linkage;
    f. allowing translating of the flexible sealing linkage to accommodate radial eccentricity between the shaft and the bore; and
    g. maintaining the annular sealing case in a coaxial relationship with the bore and maintaining the shaft sealing case in a coaxial relationship with the shaft.

2. The method of claim 1 further comprising providing a retaining means to retain the sealing case system in the bore.

3. The method of claim 1 wherein inserting the sealing case system with the first and second seals between the bore and the shaft comprises inserting the sealing case system with the first and second seals into bore; and then inserting the shaft into the seal case system.

4. The method of claim 1 wherein inserting the sealing case system with the first and second seals between the bore and the shaft comprises inserting the sealing case system with the first and second seals onto the shaft; and then inserting the shaft and the sealing case system with the first and second seals into the bore.

5. The method of claim 1, wherein sealing between a bore and a shaft serves to prevent transfer of any one or more of fluid and pressure from an exterior cavity beyond the bore to an interior cavity of the bore.

6. The method of claim 1 wherein allowing for rotational eccentricity between the shaft and bore comprise allowing the flexible linkage to translate by an amount of rotational eccentricity while maintaining the first seal and annular sealing case to remain coaxial with the bore, and while allowing the second seal and the shaft sealing case to remain coaxial with the shaft.

\* \* \* \* \*